United States Patent
Tokunaga

[11] Patent Number: 5,907,277
[45] Date of Patent: May 25, 1999

[54] DEVICE FOR DETECTING A COUNTER-STEER CONDITION

[75] Inventor: Hiroyuki Tokunaga, Wako, Japan

[73] Assignee: Honda Giken Kogyo Kabushiki Kaisha, Tokyo, Japan

[21] Appl. No.: 08/925,413

[22] Filed: Sep. 8, 1997

[30] Foreign Application Priority Data

Sep. 9, 1996 [JP] Japan .................................. 8-260318

[51] Int. Cl.⁶ ................................................ B60Q 21/00
[52] U.S. Cl. ........................... 340/441; 340/438; 701/41; 318/489; 180/412; 180/446
[58] Field of Search .................... 340/441, 438, 340/465, 439, 575; 701/41; 318/432, 446, 489; 180/412, 446, 421, 422

[56] References Cited

U.S. PATENT DOCUMENTS

| | | | |
|---|---|---|---|
| 4,669,569 | 6/1987 | Suzuki et al. ........................... | 180/249 |
| 4,688,655 | 8/1987 | Shimizu .................................. | 180/446 |
| 4,745,984 | 5/1988 | Shimizu .................................. | 180/446 |
| 4,936,406 | 6/1990 | Tezuka et al. .......................... | 180/249 |
| 4,939,653 | 7/1990 | Tsurumiya et al. ................. | 364/424.05 |
| 4,940,103 | 7/1990 | Momiyama ............................ | 180/132 |
| 4,964,481 | 10/1990 | Sano et al. ............................. | 180/140 |
| 5,089,967 | 2/1992 | Haseda et al. ..................... | 364/426.02 |
| 5,261,503 | 11/1993 | Yasui ...................................... | 180/142 |
| 5,684,700 | 11/1997 | Crocker ........................... | 364/424.051 |
| 5,729,107 | 3/1998 | Shimizu et al. ....................... | 318/489 |

*Primary Examiner*—Jeffery A. Hofsass
*Assistant Examiner*—Julie Lieu
*Attorney, Agent, or Firm*—Skjerven Morrill MacPherson Franklin & Friel LLP; Thomas S. MacDonald

[57] ABSTRACT

Provided is a counter-steer condition detecting device which is suited to be used in combination with steering control systems based on the control of the magnitude of the effort required for the vehicle operator to steer the vehicle depending on the behavior of the vehicle. An over-steer condition may be detected by evaluating the signs of the current and previous values of the steering angle and the steering angular speed, and the magnitude of the steering angular speed when the steering angle passes a certain monitor level.

6 Claims, 8 Drawing Sheets

DEVICE FOR DETECTING A COUNTER-STEER CONDITION

TECHNICAL FIELD

The present invention relates to a device for detecting a counter-steer condition, and in particular to a counter-steer condition detecting device which is suited to be used in combination with steering control systems based on the control of the magnitude of the effort required for the vehicle operator to steer the vehicle depending on the behavior of the vehicle.

BACKGROUND OF THE INVENTION

Electric power steering systems comprise a manual steering system for converting a turning angle of a steering wheel to a steering angle of road wheels, and an electric motor incorporated therein to provide an assist steering torque to the manual steering system so as to reduce the effort required for the vehicle operator to turn the steering wheel. However, such conventional electric power steering systems did not take into account changes in the road condition on which the resistance to the steering effort depends, and it is known that the assist torque tended to be excessive when the frictional coefficient between the road surface and the wheels is low such as when the road surface is covered with snow. An excessive steering assist torque tends to cause an excessive steering, and creates some discomfort to the vehicle operator.

To overcome such problems or to control such an excessive steering on slippery road surfaces, it was proposed in the copending U.S. patent application Ser. No. 08/704,968, now U.S. Pat. No. 5,729,107 filed Aug. 28, 1996 and assigned to the same Assignee to control the steering assist torque of a power steering system depending on the road condition, in particular the frictional coefficient between the road surface and the wheels. The contents of this copending application are hereby incorporated in this application by reference.

However, this previously proposed system is effective only when the steering angle and the side slip angle increase or decrease in the same direction. For instance, this relation does not hold when the vehicle has gone into a counter-steer condition or, in an extreme case, into a spin due to the insufficiency of the cornering power of the rear wheels, and the vehicle operator has steered the vehicle in the opposite direction from the turning direction of the vehicle in an attempt to regain the control of the vehicle. When such a counter-steer condition exists, the previously proposed system produces a supplemental steering torque which opposes the effort to counter-steer the vehicle, and may therefore hamper the vehicle operator in his effort to carry out the counter-steer maneuver.

BRIEF SUMMARY OF THE INVENTION

In view of such problems of the prior art and the recognition by the Inventors, a primary object of the present invention is to provide a counter-steer condition detecting device which allows a steering control system to provide a proper amount of assist steering torque at all times and ensure the steering stability at the same time.

A second object of the present invention is to provide a counter-steer condition detecting device which is useful when combined with steering control systems designed for the control of the magnitude of the effort required for the vehicle operator to steer the vehicle depending on the behavior of the vehicle.

A third object of the present invention is to provide a counter-steer condition detecting device which is simple in structure, and is therefore reliable in operation and economical to implement.

According to the present invention, these and other objects can be accomplished by providing a device for detecting a counter-steer condition of a vehicle, comprising: a steering angle sensor for measuring a steering angle, a steering angular speed detecting means for measuring a steering angular speed; storage means for storing at least signs of current and previous values of the steering angle and the steering angular speed; means for comparing the current steering angular speed with a predetermined threshold value; and a controller which produces a signal to indicate a counter-steer condition when the signs of the current and previous values of the steering angle differ from each other, the signs of the current value of the steering angle and the current and previous values of the steering angular speed coincide with each other, and the current value of the steering angular speed is greater than the predetermined threshold value.

The controller allows an over-steer condition to be detected in a highly simple manner. In particular, when incorporated into a steering control system based on the control of the magnitude of the effort required for the vehicle operator to steer the vehicle depending on the behavior of the vehicle, the counter-steer condition detecting device allows the steering control system to provide a proper amount of assist steering torque at all times and ensure the steering stability at the same time.

To avoid any abrupt change in the effort required for the vehicle operator to steer, the steering angle and the steering angular speeds are preferably measured when the absolute value of the steering angle is equal to a certain monitor point level which, for instance, is 10 degrees or less. In particular, the counter-steer condition detecting device of the present invention is beneficial when used for overriding a steering control system which controls an effort required by a vehicle operator to steer the vehicle according to a behavior of the vehicle. Typically, the behavior of the vehicle is defined such that the steering effort increases as the steering angle approaches a limit steering angle beyond which a side slip angle of steerable road wheels of the vehicle exceeds a prescribed limit value.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
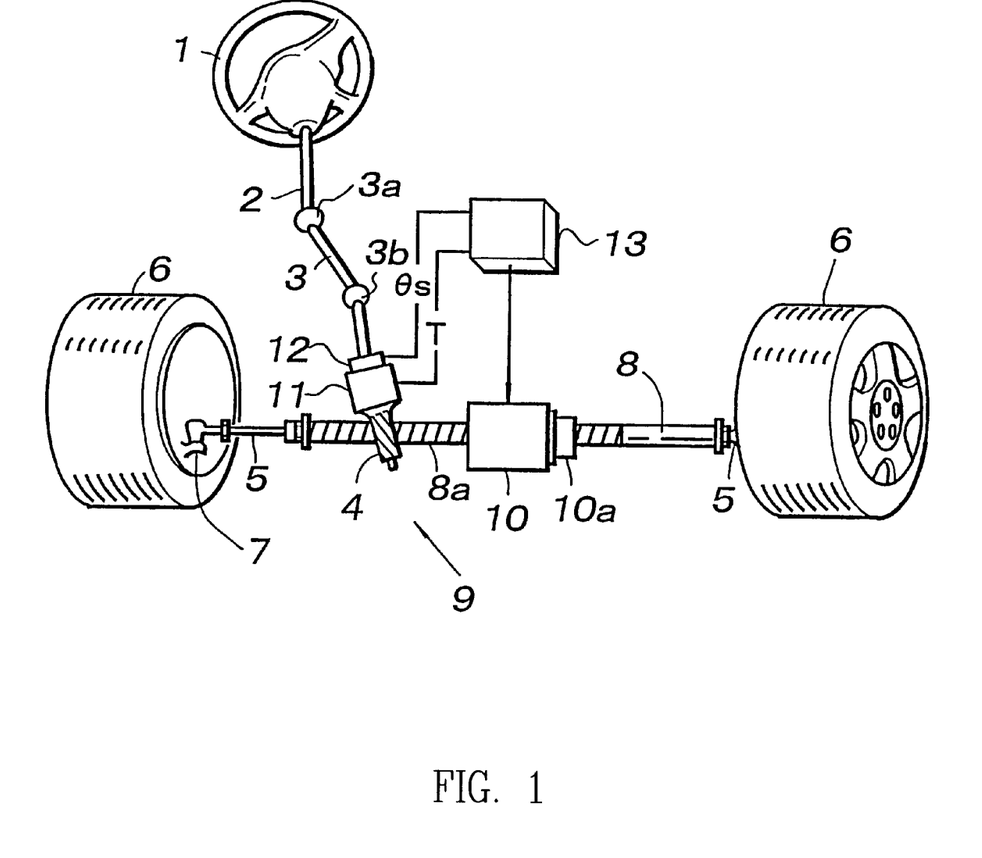
FIG. 1 is a diagrammatic view of the steering system to which the present invention is applied.

FIG. 1 illustrates an electric power steering system to which the present invention is applied. A steering wheel 1 is attached to an upper end of a steering shaft 2, and a lower end of the steering shaft 2 is connected to a pinion 4 via a connecting shaft 3 which is provided with universal joints 3a and 3b at two ends thereof. The pinion 4 meshes with a rack 8a which is formed in a rack shaft 8 extending laterally of the vehicle body and guided to move along a longitudinal axial line thereof. The two ends of the rack shaft 8 are connected to knuckle arms 7 of right and left front wheels 6 via tie rods 5. This manual steering system is generally denoted with numeral 9 in FIG. 1. To provide a power assist to this steering system, an electric motor 10 is coaxially combined with the rack shaft 8 for axially actuating the rack shaft 8. The electric motor 10 is incorporated with a ball screw mechanism for converting the rotational movement of the motor 10 to an axial force of the rack shaft 8. A steering torque sensor 11 and a steering angle sensor 12 are provided in appropriate parts of the steering system, such as the steering shaft 2, to detect the magnitude of the steering effort applied to the steering wheel 1 by the vehicle operator, and the steering angle of the steering wheel 1, respectively. The electric motor 10 is controlled by a controller 13 which receives output signals T and θs from these sensors 11 and 12.

Figure 2:
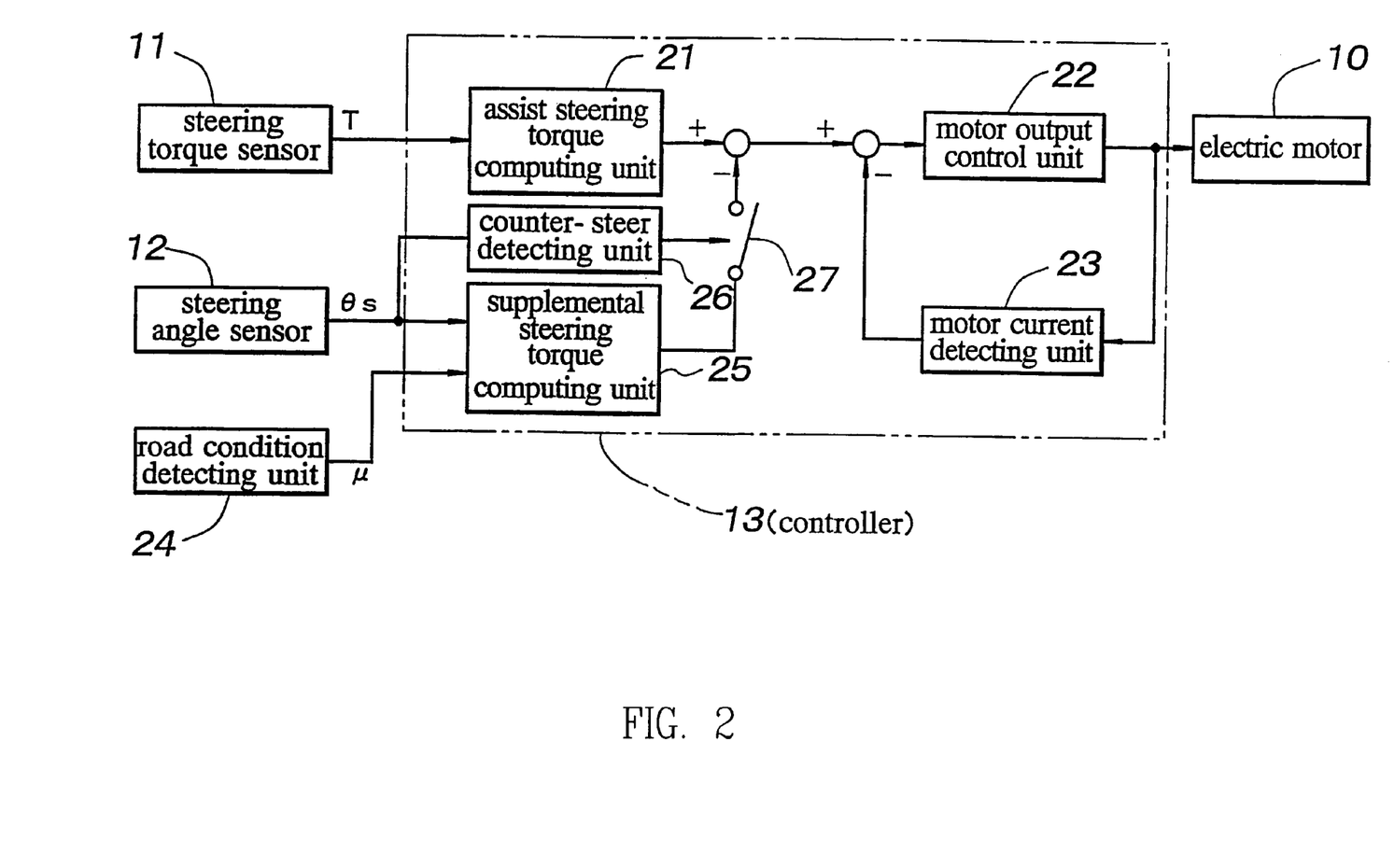
FIG. 2 is a block diagram of the steering control system.

The controller 13 essentially consists of an assist steering torque control segment and an excessive steering torque control segment. Referring to FIG. 2, the assist steering torque control segment comprises an assist steering torque computing unit 21 for setting a target assist steering torque which should be produced from the electric motor 10 according to the output T from the steering torque sensor 11, a motor output control unit 22 for controlling the output of the electric motor 10 according to the thus set target of the motor output, and a motor current detecting unit 23 for detecting and feeding back the current conducted through the electric motor 10. The excessive steering torque control segment comprises a road condition detecting unit 24 for detecting the frictional coefficient μ between the road surface and the road wheels, and a supplemental steering torque computing unit 25 for determining the supplemental steering torque that should be applied to the steering wheel 1 according to the outputs μ and θs from the road condition detecting unit 24 and the steering angle sensor 12. In this embodiment, the output of the supplemental steering torque computing unit 25 is subtracted from the output of the assist steering torque computing unit 21.

A gate 27 is provided in the output line of the supplemental steering torque computing unit 25 so as to selectively interrupt the output line of the supplemental steering torque computing unit 25 according to the state of the output from a counter-steer determining unit 26 which determines the presence of a counter-steer condition from the steering angle θs as described hereinafter.

A method for estimating the road frictional coefficient μ in the road condition detecting unit 24 is described in the following. The cornering power Cp of a tire can be expressed as given in the following according to Fiala's equation (a second order approximation).

$$Cp = K(1 - 0.0166K/\mu L)$$

where K is the cornering stiffness, μ is the road frictional coefficient, and L is the wheel load.

Figure 3:
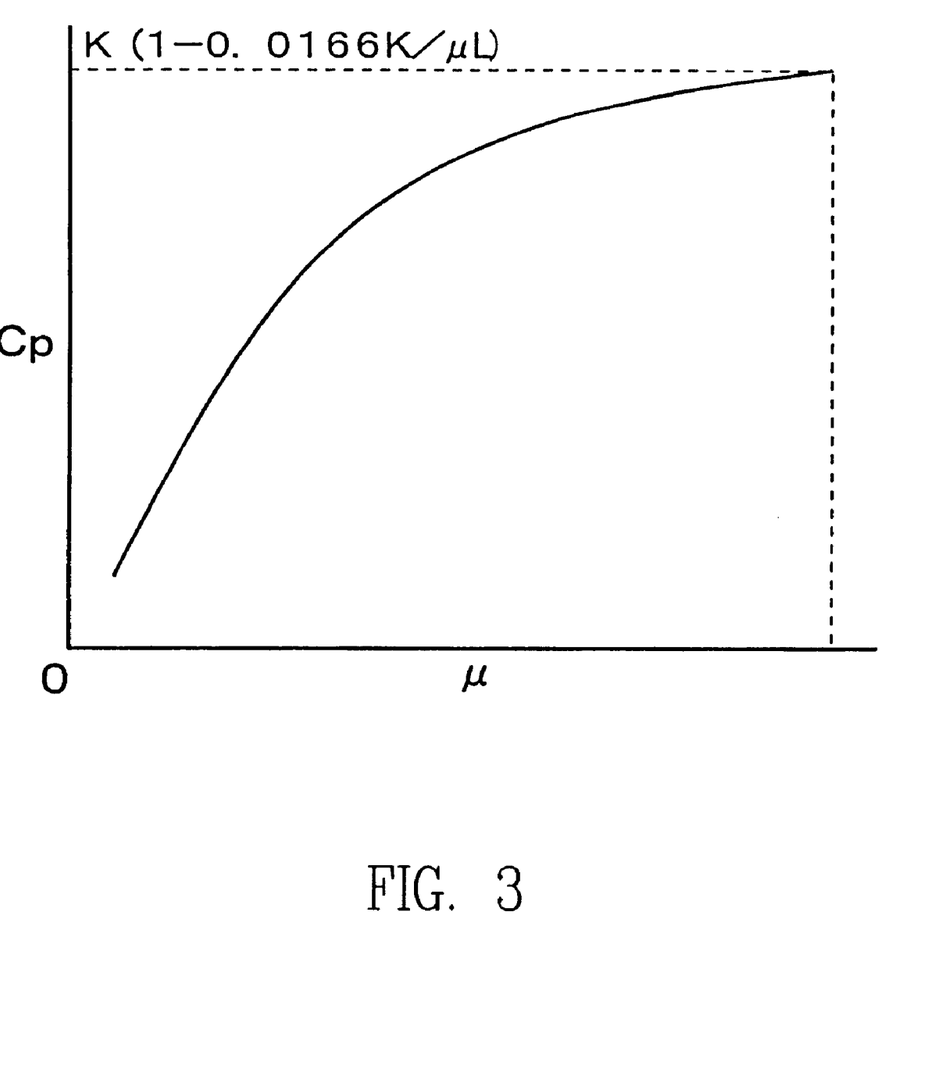
FIG. 3 is a graph showing the relationship between the cornering power and the road frictional coefficient.

In other words, because the tire cornering power Cp diminishes with a reduction in the road frictional coefficient μ (see FIG. 3), the rack shaft reaction which the rack and pinion gear system receives from the road surface for a given steering angle diminishes with a reduction in the road frictional coefficient μ because rack reaction is proportional to the moment caused by the cornering power around the virtual kingpin. Therefore, by actually measuring the steering angle and the rack shaft reaction, and comparing the actual rack shaft reaction for a given steering angle with a reference rack shaft reaction, it is possible to estimate the road frictional coefficient μ.

The actually measured rack shaft reaction Frc or the road reaction can be estimated from the steering torque T, the motor voltage Vm, and the motor current Im as described in the following. First of all, the output torque Tm of the electric motor for providing the assist steering torque in the electric power steering system can be given by the following equation.

$$Tm = Kt \cdot Im - Jm \cdot \theta m'' - Cm \cdot \theta m' \pm Tf$$

where
  Kt: motor torque constant
  Im: motor current
  Jm: moment of inertia of the rotor of the electric motor
  θm': angular speed of the electric motor
  θm'': angular acceleration of the electric motor
  Cm: damping coefficient of the electric motor
  Tf: frictional torque The damping coefficient, the moment of inertia, and the frictional resistance regarding the movement of the steering shaft and the frictional resistance to the movement of the motor may be disregarded as they are small. Then, the balance of forces for the rack shaft can be approximated by the following equation.

$$Fr = Fs + Fm$$

$$= Ts/rp + N(Kt \cdot Im - Jm \cdot \theta m'' - Cm \cdot \theta m')$$

where
  Fr: rack shaft reaction from the road surface
  Fs: rack shaft axial force applied from the pinion
  Fm: rack shaft axial force applied by the motor
  Ts: actual steering torque applied to the steering shaft
  rp: pinion radius
  N: motor output gear ratio The angular speed of the motor θm' can be found either by differentiating the steering wheel angle θs or by applying the following equation to the electromotive force produced from the motor.

$$\theta m' = (Vm - Im \cdot Rm)/Km$$

where
  Vm: voltage across the motor
  Rm: electric resistance of the motor
  Km: inductive voltage constant of the electric motor Precisely speaking, the angular speed of the motor θm' and the angular speed of the steering wheel θs' are not identical to each other. The angular speed of the motor θm' can be computed from the angular speed of the steering wheel θs' which is obtained by differentiating the steering wheel angle θs according to the following equation.

$$\theta m' = \theta s' - T'/Ks$$

where
Ks: spring constant of the torque sensor
T': differentiated value of the steering torque
The angular acceleration of the motor θm" can be obtained by differentiating the angular speed of the motor θm'.

Figure 4:
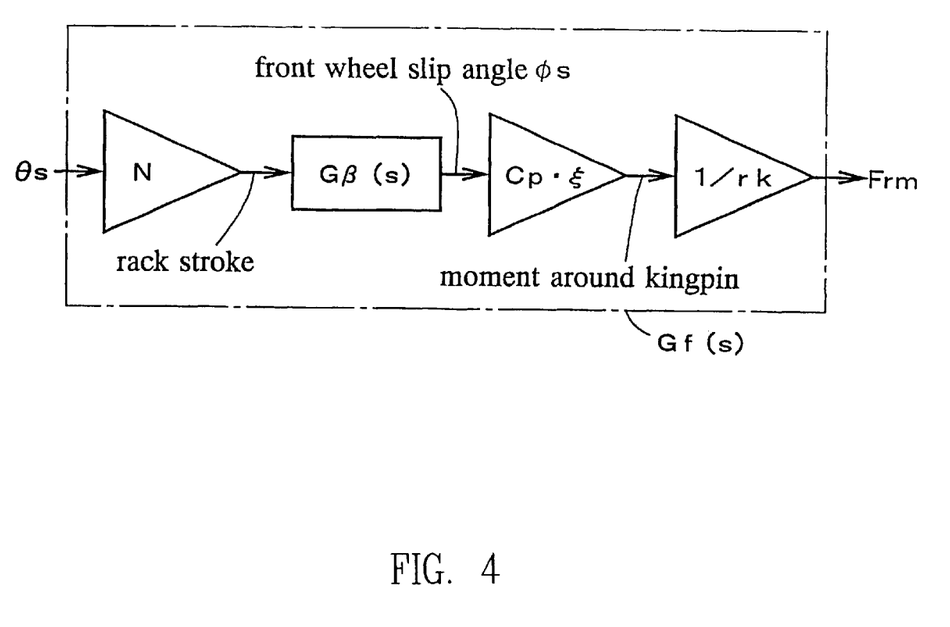
FIG. 4 is a flow chart showing the construction of the internal model.

The internal model for generating the reference value for the rack shaft reaction is determined as described in the following. Referring to FIG. 4, the steering angle θs given from the steering wheel 1 is converted into a certain stroke of the rack shaft 8 according to a transmission ratio between the rack 8a and the pinion 4. A side slip angle of the front wheels βs is produced in response to the stroke of the rack shaft 8. The transfer function Gβ(s) of the front wheel side slip angle βs with respect to the stroke of the rack shaft 8 changes with a change in a stability factor resulting from a change in the road frictional coefficient μ.

Multiplying the front wheel side slip angle βs by the cornering power Cp and the trail ξ (caster trail+pneumatic trail) produces a moment around the kingpin. The cornering power Cp and the trail ξ are dependent on the road frictional coefficient μ and the wheel contact load L. Dividing the moment around the kingpin by the distance between the pivot center of the wheel and the center of the rack shaft or the knuckle arm length rk produces a model rack shaft reaction Frm.

From the above description, it can be appreciated that the response of the model rack shaft reaction Frm to the steering wheel angle θs can be represented by a single transfer function Gf(s) which can be either computed from various specifications of the vehicle or identified by a measurement of the actual behavior of the vehicle.

Figure 5:
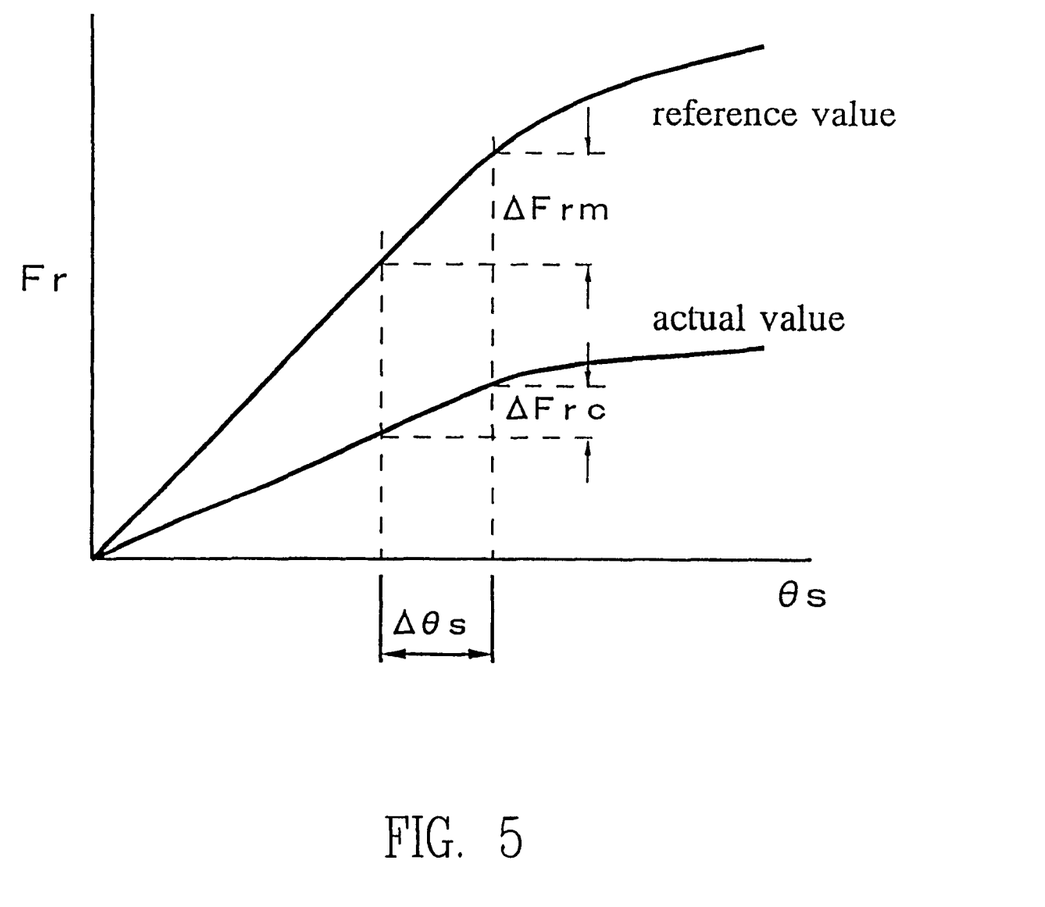
FIG. 5 is a graph showing the responses of the model and reference rack shaft reactions to different steering angles.
Figure 6:
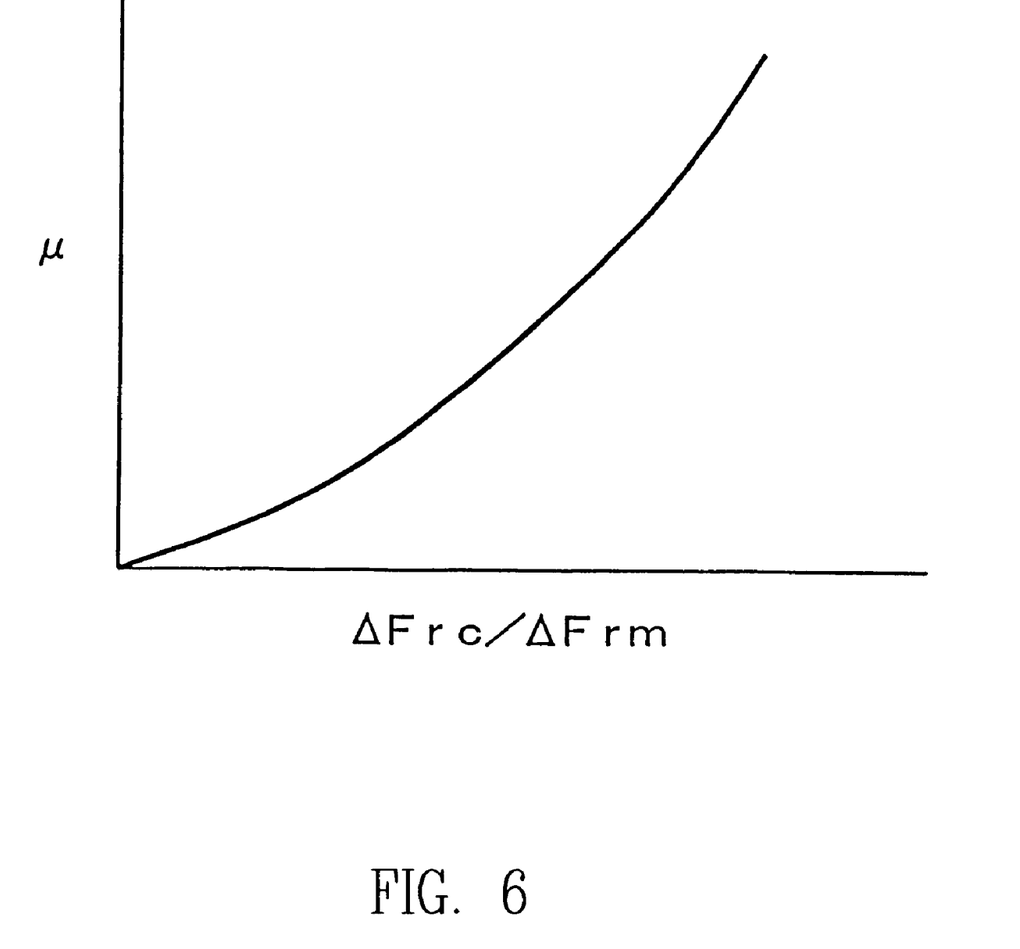
FIG. 6 is a graph showing the map for determining the road frictional coefficient.

The increases of the actual and model rack shaft reaction Frc and Frm for a given increase of the steering wheel angle θs are obtained according to the actual rack shaft reaction Frc and the model rack shaft reaction Frm obtained as described above (see FIG. 5), and the road frictional coefficient μ can be estimated by looking up a pre-defined map for determining the road friction according to the ratio ΔFrc/ΔFrm of the actual rack shaft increase ratio ΔFrc/Δθs to the model rack shaft increase ratio ΔFrm/Δθs in a steering angle range in which the vehicle response can be approximated by a linear equation (see FIG. 6). The actual rack shaft reaction can also be directly measured by providing a force sensor such as a load cell in a suitable location of the knuckle arm 7, the tie rod 5 or the rack shaft 8.

Figure 7:
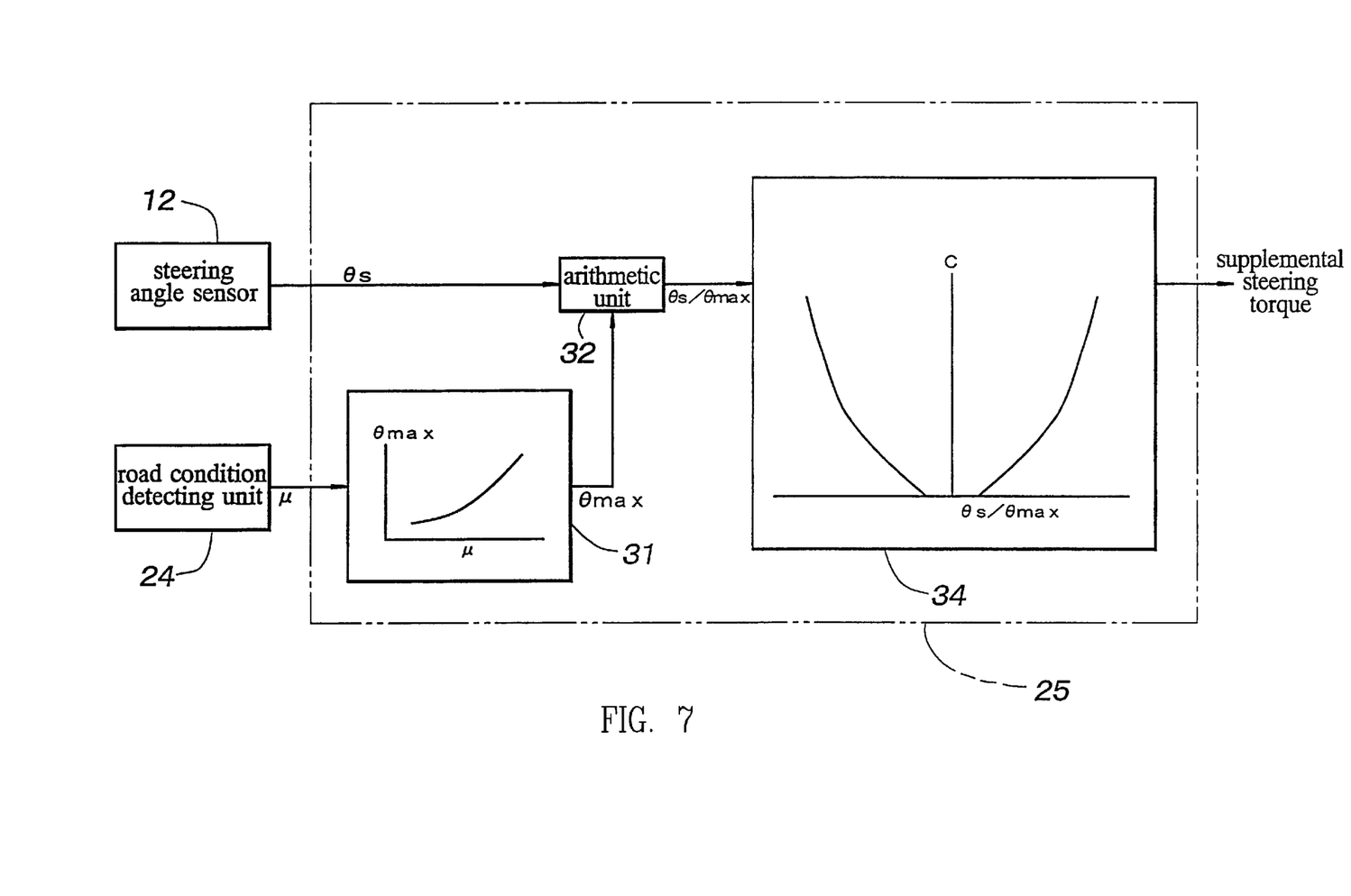
FIG. 7 is a block diagram of the supplemental steering torque computing unit.

Now the operation of this embodiment is described in the following with reference to FIG. 7. First of all, the road frictional coefficient μ is measured by the road condition detecting unit 24, and a maximum permissible steering angle θmax for the current road frictional coefficient μ is determined from a map 31 which defines the relationship between them. The ratio of the current or actual steering angle θs, which is measured by the steering angle sensor 12, to the maximum permissible steering angle θmax is computed by an arithmetic unit 32, and a corresponding supplemental steering torque C is looked up from a supplemental steering torque map 34 which gives the supplemental reaction for each steering angle ratio θs/θmax while taking into account the steering angular speed θs' which is obtained by processing the output θs of the steering angle sensor 12 with a differentiator 33. This supplemental torque is deducted from the target assist steering torque by the assist steering torque computing unit 21 of the assist steering torque control segment of the system. When the assist steering torque is reduced in this manner, the vehicle operator can sense an increase in the force required to turn the steering wheel 1, and is prevented from steering excessively so that the vehicle can be properly controlled even on slippery road surfaces.

When the steering angular speed θs' is high, the steering energy due to the inertia of the steering system becomes so great that the normal supplementary steering torque control may not be adequate in controlling excessively steering. Therefore, according to the present invention, the magnitude of the supplemental steering torque for a given steering angle ratio θs/θmax is made dependent on the steering angular speed θs'. Generally, as the steering angular speed θs' increases, the supplemental steering torque is increased so as to increase the resistance to the steering effort. Thus, the effort required to turn the steering wheel is properly controlled by the supplemental steering torque so that the steering stability of the vehicle can be ensured without regard to the speed of turning the steering wheel. In other words, because the steering assist torque is controlled by taking into account both the road surface condition and the steering speed, the vehicle operator can sense and be properly guided by the steering resistance which he experiences without regard to the steering speed.

When a vehicle makes a turn on a slippery road surface at an excessive speed, the rear wheels tend to slip sideways, causing the vehicle to turn more sharply than intended by the vehicle operator. Under such a condition, it is necessary for the vehicle operator to steer the vehicle in the opposite direction, or outward with respect to the turning circle, until the slipping of the rear wheels abates. This is called as counter-steer maneuver. When this counter-steer condition is initiated, a certain discrepancy is created between the steering angle and the side slip angle of the front wheels so that the supplemental steering torque computing unit 25 may produce an output which severely hampers the vehicle operator in his attempt to take the counter-steer action. Therefore, according to this embodiment, the counter-steer condition determining unit 26 determines if a counter-steer condition has been produced or not according to the relationship between the steering angle and the steering angular speed, and prevents the supplemental steering torque from being applied to the steering assist torque when a counter-steer condition is detected.

Figure 8:
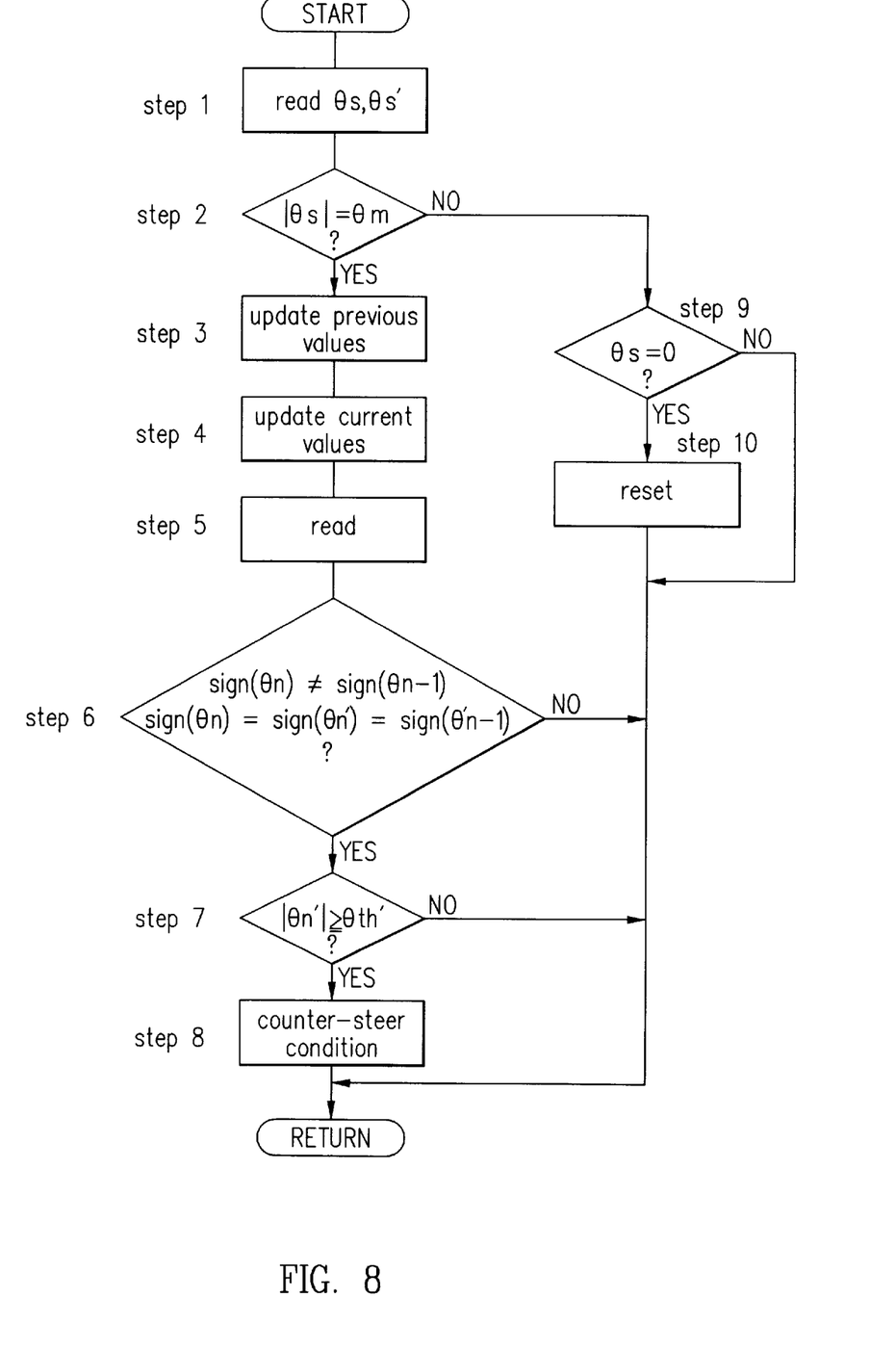
FIG. 8 is a flow chart for describing the operation of the device for determining a counter-steer condition.

The control process for the determination of a counter-steer condition is described in the following with reference to the flow chart of FIG. 8. The current steering angle θs and steering angular speed θs' are read (step 1), and the absolute value of the steering angle is compared with a monitor point angle θm (which, for instance, may be ±10 degrees away from the neutral position) at which a test for a counter-steer condition should be carried out (step 2). This angle θm is selected to be sufficiently small so that the interruption of the supplementary steering torque may happen only when the steering angle is sufficiently small and the supplementary steering torque is therefore small. Also, this angle is selected to be sufficiently large so that a slight back-and-forth turning movement of the steering wheel may not be confused with an actual counter-steering action. Thus, when the steering angle passes this monitor point angle, the values (signs) of the previous steering angle and steering angular speed are renewed (step 3), and the values of the present steering angel and steering angular speed are also renewed (step 4). These values are stored in assigned storage areas (step 5). If the steering angle does not passes the monitor point angle in step 2, the program flow advances to step 9.

Even when the steering wheel is turned rapidly, as long as it started from the vicinity of the neutral position, because the normal relationship holds between the steering angle and the side slip angle of the front wheels, the operation of the excessive steering control segment of the system is not required to be interrupted. For this reason, it is necessary to distinguish a rapid steering starting from the neutral position from an actual counter-steer action. This can be accomplished by comparing the signs of the present and previous values of the steering angle and the steering angular speed (step 6).

When a counter-steer action is carried out, the steering direction or the sign of the steering angle changes from the previous value to the present value, or $$\text{sign } (\theta n) \neq \text{sign } (\theta n-1).$$

Also, the signs of the values of the present steering angle, the present steering angular speed, and the previous steering angular speed all agree with each other, or $$\text{sign } (\theta n) = \text{sign } (\theta n') = \text{sign } (\theta' n-1).$$

A counter-steer condition can be distinguished from a rapid steering from the neutral position by determining if these conditions are met. If these conditions are met, the program flow advances to step 7. Otherwise, the program flow is renewed.

Because the steering speed during a counter-steer action is substantially higher than the steering speed during a normal steering action, the absolute value of the present steering angular speed $\theta n'$ is compared with a threshold value of the steering angular speed $\theta th'$ (step 7). If the present steering angular speed exceeds the threshold value, it is determined that a counter-condition exists, and the output from the supplemental steering torque computing unit 25 is disconnected by the gate 27 (step 8). If the present steering angular speed falls below the threshold value in step 7, the program flow is renewed.

It is generally difficult to determine when a counter-steer action ends. However, because the excessive steering control segment of the system relies on the steering angle for its operation, it suffices if the control action is re-evaluated each time the steering angle crosses the neutral position. Thus, when the crossing of the zero point by the steering angle is detected in step 9, the process of detecting a counter-steer condition is reset or renewed in step 10. The subsequent process of detecting a counter-steer condition is resumed when the present steering angle crosses the monitor point again. Alternatively, the resetting of the process of detecting a counter-steer condition may also occur as soon as the steering angle falls below the level of the monitor point or a value defined between the monitor point level and zero.

Although the present invention has been described in terms of specific embodiment thereof, it is possible to modify and alter details thereof without departing from the spirit of the present invention.

What we claim is:

1. A device for detecting a counter-steer condition of a vehicle, comprising:

a steering angle sensor for measuring a steering angle;

a steering angular speed detecting means for measuring a steering angular speed;

storage means for storing at least signs of current and previous values of the steering angle and the steering angular speed;

means for comparing the current steering angular speed with a predetermined threshold value; and a controller which produces a signal to indicate a counter-steer condition when the signs of the current and previous values of the steering angle differ from each other, the signs of the current value of the steering angle and the current and previous values of the steering angular speed coincide with each other, and the current value of the steering angular speed is greater than the predetermined threshold value.

2. A device for detecting a counter-steer condition of a vehicle according to claim 1, wherein the steering angle and the steering angular speeds are measured when the absolute value of the steering angle is equal to a certain monitor point level.

3. A device for detecting a counter-steer condition of a vehicle according to claim 2, wherein said monitor point level is set at a substantially small value.

4. A device for detecting a counter-steer condition of a vehicle according to claim 3, wherein said monitor point level is 10 degrees or less.

5. A device for detecting a counter-steer condition of a vehicle according to claim 1, wherein said device is used for overriding a steering control system which controls an effort required by a vehicle operator to steer the vehicle according to a behavior of the vehicle.

6. A device for detecting a counter-steer condition of a vehicle according to claim 5, wherein said behavior of the vehicle is defined such that the steering effort increases as the steering angle approaches a limit steering angle beyond which a side slip angle of steerable road wheels of the vehicle exceeds a prescribed limit value.

* * * * *